United States Patent
Ansai et al.

(10) Patent No.: US 11,840,744 B2
(45) Date of Patent: Dec. 12, 2023

(54) METHOD FOR RECOVERING GOLD AND GOLD RECOVERY FACILITY

(71) Applicant: HYMO Corporation, Tokyo (JP)

(72) Inventors: Ryuichi Ansai, Tokyo (JP); Fumi Oono, Tokyo (JP); Satoshi Sakuma, Tokyo (JP); Fumiaki Satou, Tokyo (JP); Akihiro Ishii, Tokyo (JP); Yasuharu Mori, Tokyo (JP)

(73) Assignee: HYMO Corporation, Tokyo (JP)

(*) Notice: Subject to any disclaimer, the term of this patent is extended or adjusted under 35 U.S.C. 154(b) by 407 days.

(21) Appl. No.: 16/908,003

(22) Filed: Jun. 22, 2020

(65) Prior Publication Data

US 2020/0318217 A1  Oct. 8, 2020

Related U.S. Application Data

(63) Continuation of application No. PCT/JP2018/048325, filed on Dec. 27, 2018.

(30) Foreign Application Priority Data

Dec. 27, 2017 (JP) .................................. 2017-250325

(51) Int. Cl.
    *C22B 11/00* (2006.01)
    *C22B 3/24* (2006.01)
    *C22B 3/26* (2006.01)

(52) U.S. Cl.
    CPC ............... *C22B 11/04* (2013.01); *C22B 3/24* (2013.01); *C22B 3/41* (2021.05)

(58) Field of Classification Search
    CPC ........ B01J 20/26; B01J 20/264; B01J 20/267; B01J 45/00; C08F 26/00; C08F 26/02;
    (Continued)

(56) References Cited

U.S. PATENT DOCUMENTS 3,970,737 A     7/1976  Davidson
5,411,573 A *   5/1995  Kang .................. C22B 3/44
                                                 423/DIG. 14
(Continued)

FOREIGN PATENT DOCUMENTS

JP     50-084417 A     7/1975
JP     04-075285 B2    11/1992
(Continued)

OTHER PUBLICATIONS

Joan L. Tomsic, ed., Dictionary of Materials and Testing, Second Ed., SAE International, Society of Automotive Engineers, 2000, p. 344. (Year: 2000).*

(Continued)

*Primary Examiner* — Vanessa T. Luk
(74) *Attorney, Agent, or Firm* — Oblon, McClelland, Maier & Neustadt, L.L.P.

(57) ABSTRACT

Provided are a method for recovering gold, in which gold is recovered from a solution containing a gold cyano complex using a crosslinked resin containing a vinyl amine unit, by which gold can be efficiently recovered from the solution not only in a case (A) where a concentration of the gold cyano complex in the solution is low but also in a case (B) where another metal is dissolved in the solution; a method for recovering gold, in which the crosslinked resin and the solution are brought into contact with each other to separate the crosslinked resin and the solution from each other, by which gold can be efficiently recovered from the solution not only in the case (A) but also in the case (B); and a gold recovery facility comprising: a container inside which the crosslinked resin is accommodated in a flowable manner; and a device which feeds the solution to the container, by which gold can be efficiently recovered from the solution not only in the case (A) but also in the case (B).

3 Claims, 1 Drawing Sheet

(58) Field of Classification Search
CPC .... C22B 3/20; C22B 3/22; C22B 3/24; C22B 3/41; C22B 11/00; C22B 11/04; C22B 11/042; C22B 11/044; C22B 11/046; C22B 11/048; C22B 11/08
See application file for complete search history.

(56) References Cited

U.S. PATENT DOCUMENTS

| | | | | |
|---|---|---|---|---|
| 5,599,898 | A * | 2/1997 | Hartmann | B01J 39/20 528/319 |
| 2004/0197249 | A1* | 10/2004 | Wan | C22B 3/42 423/29 |
| 2004/0213715 | A1* | 10/2004 | Lucien | C22B 15/0076 423/40 |
| 2005/0121390 | A1* | 6/2005 | Wallace | C08L 101/12 210/688 |
| 2009/0120879 | A1 | 5/2009 | Aoshima et al. | |
| 2017/0304803 | A1* | 10/2017 | Meyer | B01J 20/321 |

FOREIGN PATENT DOCUMENTS

| | | | |
|---|---|---|---|
| JP | 4981671 B2 | 7/2012 | |
| JP | 2013-103161 A | 5/2013 | |
| JP | 2014-176780 A | 9/2014 | |
| JP | 2017-070909 A | 4/2017 | |
| JP | 2018008186 A * | 1/2018 | |
| WO | WO-2016030021 A1 * | 3/2016 | ............ B01D 15/08 |

OTHER PUBLICATIONS

International Search Report dated Feb. 19, 2019 in PCT/JP2018/048325 filed on Dec. 27, 2018 (with English Translation), 4 pages.

Gotoh et al., "Metal Hydroxide Formation in DMAPAA Hydrogel and Novel Metal Ion Removal Method", The Society of Chemical Engineers, Japan, vol. 43, No. 4, 2017, 18 pages (with English Machine Translation).

Nakahiro, "New Process for Recovery of Gold", Journal of the Mining and Materials Processing Institute of Japan, vol. 108, No. 12, 8 pages (with Partial English Machine Translation) (publication year: 1992).

* cited by examiner

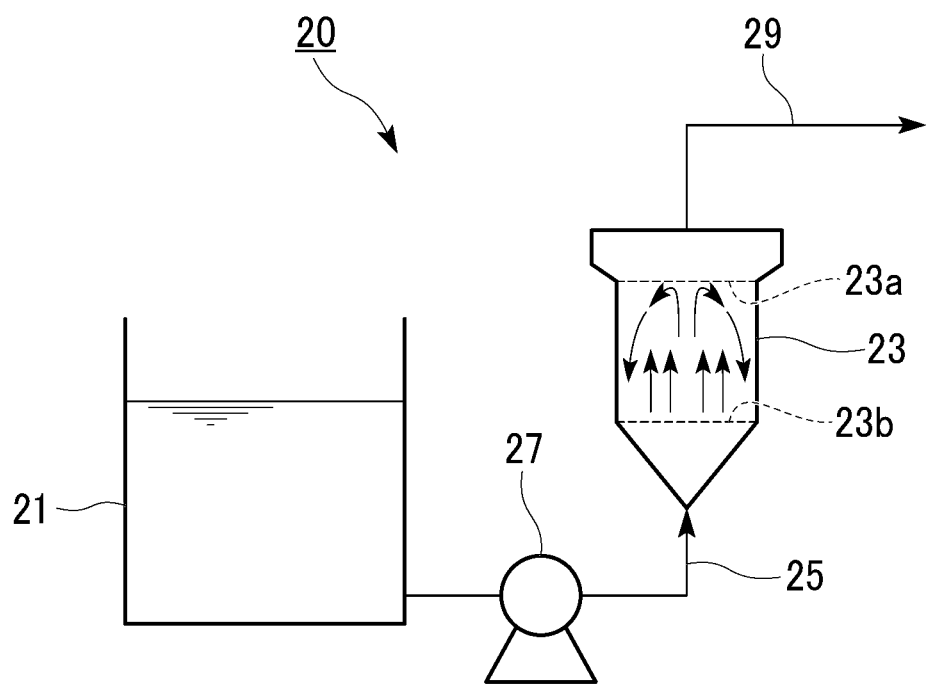

METHOD FOR RECOVERING GOLD AND GOLD RECOVERY FACILITY

This application is a continuation application of International Application No. PCT/JP2018/048325, filed on Dec. 27, 2018, which claims the benefit of priority of the prior Japanese Patent Application No. 2017-250325 filed in Japan on Dec. 27, 2017, the content of which is incorporated herein by reference.

TECHNICAL FIELD

The present invention relates to a method for recovering gold and a gold recovery facility.

BACKGROUND ART

Noble metals are extremely valuable metals and are produced in only small amounts. In particular, the abundance of gold in mineral ores is extremely small. As a method for refining gold in mineral ores, a method such as amalgamation with mercury has been used since early times, but currently, a method using a cyaniding method is general. In the cyaniding method, mineral ores containing gold are pulverized, gold is extracted as a cyano complex using a cyanide solution, the cyanide solution containing a gold cyano complex and the mineral ores are separated from each other, and gold is recovered. As a method for recovering gold from a cyanide solution, for example, a method of substituting gold of a gold cyano complex with a metal such as zinc to precipitate gold or a method of adsorbing a gold cyano complex to activated charcoal is used.

In a drainage obtained from the process as described above, the gold cyano complex exists in spite of existing in an extremely small amount. It is an important issue to recover and reuse rare gold.

Conventionally, activated charcoal or an ion-exchange resin is used in recovering of a metal in water. The activated charcoal or the ion-exchange resin adsorbs a metal existing in solution and thereby traps the metal.

However, these trapping agents have problems such as a low adsorption rate, a small adsorbed amount, and low selectivity.

The gold cyano complex is very stable among complexes formed by gold, and it is difficult to efficiently recover gold from a low-concentration gold cyano complex solution such as a drainage by a cyaniding method with these trapping agents.

Other than the ion-exchange resin and the activated charcoal, as a trapping agent recovering a metal from an aqueous solution in which the metal is dissolved, the following (1) to (3), and the like have been proposed:

(1) a hydrogel having an amino group (Non-Patent Document 1);
(2) polyvinylamine crosslinked polymer particles (Patent Document 1); and
(3) a mixture of an amine-based polymer and a hydrophilic polymer (Patent Document 2).

However, in any of documents, in the case of recovering gold, those to be trapped by a trapping agent are gold ions, there is no description that the trapping agent traps a gold cyano complex, and it has not been reviewed whether these trapping agents can be applied to a method through the gold cyano complex that is predominant in the recovering of gold from gold ores, and the like.

Meanwhile, a method has been proposed in which divalent copper ions and a reducing agent are added to discharged water having a gold cyano complex which is discharged from a gold plating process or the like, and the gold cyano complex is precipitated and separated (Patent Document 3).

However, in this method, it is necessary to add excessive amounts of a copper salt and a reducing agent with respect to gold, which is not economical. In addition, a reaction tank for coagulation and precipitation is needed, a device may be increased in size as compared to an adsorption tower or the like.

CITATION LIST

Patent Document

Patent Document 1: JP 2017-70909 A
Patent Document 2: JP 4981671 B2
Patent Document 3: JP 4-075285 B Non-Patent Document Non-Patent Document 1: Journal of Chemical Engineering of Japan, Vol. 43, Issue 4, p 199-206, 2017

SUMMARY OF THE INVENTION

Problem to be Solved by the Invention

An object of the invention is to provide a method for recovering gold by which gold can be efficiently recovered from a solution containing a gold cyano complex not only in a case where the concentration of the gold cyano complex in the solution is low but also in a case where another metal is dissolved in the solution, and a gold recovery facility.

Means for Solving Problem

The invention has the following embodiments.

[1] A method for recovering gold, in which gold is recovered from a solution containing a gold cyano complex using a crosslinked resin containing a vinyl amine unit.

[2] A method for recovering gold, in which a crosslinked resin containing a vinyl amine unit and a solution containing a gold cyano complex are brought into contact with each other to separate the crosslinked resin and the solution from each other.

[3] The method for recovering gold described in [1] or [2], in which the solution is a drainage obtained after recovering gold in a cyaniding method.

[4] The method for recovering gold described in [3], in which the solution is a drainage obtained after recovering gold by an adsorption treatment by activated charcoal or a precipitation treatment by addition of zinc in the cyaniding method.

[5] The method for recovering gold described in any one of [1] to [4], in which at least a part of the vinyl amine unit in the crosslinked resin forms a salt with an acid, and the acid is at least one selected from the group consisting of mineral acid, formic acid, and acetic acid.

[6] The method for recovering gold described in any one of [1] to [5], in which the solution contains impurity ions containing a metal other than gold, and the solution and the crosslinked resin are brought into contact with each other at a pH of 3.5 or less.

[7] A gold recovery facility including: a container inside which a crosslinked resin containing a vinyl amine unit is accommodated in a flowable manner; and a device which feeds a solution containing a gold cyano complex to the container.

Effect of the Invention

According to the method for recovering gold or the gold recovery facility of the invention, it is possible to efficiently recover gold from a solution containing a gold cyano complex not only in a case where the concentration of the gold cyano complex in the solution is low but also in a case where another metal is dissolved in the solution.

BRIEF DESCRIPTION OF DRAWINGS

FIG. 1 is a schematic diagram illustrating an example of a gold recovery facility according to a first embodiment.

MODE(S) FOR CARRYING OUT THE INVENTION

In a method for recovering gold of the invention, gold is recovered from a solution containing a gold cyano complex using a crosslinked resin containing a vinyl amine unit.

Incidentally, in the present specification and claims, "to" representing the range of the numerical values means to include the numerical values before and after "to" as the lower limit value and the upper limit value.

The term "unit" in the crosslinked resin refers to a structure derived from a monomer or a crosslinking agent used in polymerization and crosslinking. This structure may be changed by reaction after polymerization.

(Crosslinked Resin)

The crosslinked resin contains a vinyl amine unit.

In the vinyl amine unit, one hydrogen atom of the amino group ($-NH_2$) is substituted with an alkyl group having 1 to 6 carbon atoms. The alkyl group may be linear or branched, and an alkyl group having 1 to 6 carbon atoms is preferred.

The vinyl amine unit may form a salt with an acid.

The present inventor has found that in a case where at least a part of the vinyl amine unit in the crosslinked resin forms a salt with an acid, the adsorptive property of gold is excellent as compared to a case where a salt is not formed. Therefore, it is preferable that at least a part of the vinyl amine unit in the crosslinked resin forms a salt with an acid.

As the acid, any acid may be used as long as it can form a salt with the vinyl amine unit, and examples thereof include hydrochloric acid, nitric acid, sulfuric acid, phosphoric acid, formic acid, and acetic acid. As the acid, from the viewpoint that reactivity of hydrolytic degradation is more excellent, at least one selected from the group consisting of a mineral acid such as hydrochloric acid, nitric acid, or sulfuric acid, formic acid, and acetic acid is preferred.

One hydrogen atom of the amino group may be substituted with a substituent, and a vinyl amine unit not forming a salt with an acid, that is, a vinyl amine unit of a free type is represented, for example, by the following Formula (1).

One hydrogen atom of the amino group may be substituted with a substituent, and a vinyl amine unit forming a salt with an acid, that is, a vinyl amine unit of a salt type is represented, for example, by the following Formula (2).

[Chem. 1]

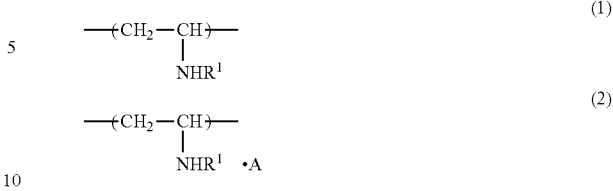

(In Formula (1) and Formula (2), $R^1$ represents a hydrogen atom or an alkyl group having 1 to 6 carbon atoms, A represents an acid of 1/n mol, and n represents a valence of the acid.)

The alkyl group in $R^1$ and the acid in A are the same as described above, respectively.

The vinyl amine unit is typically formed by hydrolytic degradation of the N-vinylcarboxylic acid amide unit. When the hydrolytic degradation is performed in the presence of a base, a vinyl amine unit not forming a salt with an acid is generated. When the hydrolytic degradation is performed in the presence of acid, a vinyl amine unit of a salt type is generated. In a case where the hydrolytic degradation is performed in the presence of a base, by adding an acid to the obtained crosslinked resin, at least a part of the vinyl amine unit can be made to be a salt type. Since the adsorptive property of gold is excellent when at least a part of the vinyl amine unit in the crosslinked resin forms a salt with an acid, it is preferable that at least a part of the vinyl amine unit in the crosslinked resin forms a salt with an acid. The ratio of the vinyl amine unit of the salt type to the whole vinyl amine unit (the vinyl amine unit of the salt type/(the vinyl amine unit of the free type+the vinyl amine unit of the salt type)) is preferably 1 mol % or more, further preferably 5 mol % or more, and particularly preferably 10 mol % or more. The resin containing vinyl amine is used in various use applications, but generally, when impurities such as an acid are contained in the vinyl amine unit, a sufficient performance cannot be expected. However, in the invention, by making it a point to contain an acid in the vinyl amine unit, the adsorption rate of gold can be increased. Further, even when washing with water is performed in the process of producing the crosslinked resin in order to remove other impurities, the acid remains in the vinyl amine unit since the acid forms a salt with the vinyl amine unit, so that only unnecessary impurities can be efficiently removed.

The crosslinked resin includes a crosslinked structure.

The crosslinked structure is typically formed by copolymerization of the crosslinkable monomer. In this case, the crosslinked resin contains a crosslinkable monomer unit.

The crosslinkable monomer has two or more polymerizable functional groups. Examples of the polymerizable functional groups include a vinyl group, an allyl group, and a (meth)acryloyl group.

Examples of the crosslinkable monomer include aromatic polyvinyl compounds (such as divinylbenzene, trivinylbenzene, and divinyl toluene), poly(meth)acrylates (such as ethylene glycol di(meth)acrylate, diethylene glycol di(meth)acrylate, glycerol di(meth)acrylate, and trimethylolpropane tri(meth)acrylate), methylenebisacrylamide, triallyl cyanurate, triallyl isocyanurate, triallyl phosphate, triallyl amine, diallyl-dialkylammonium salt, polyallyl ether compounds (such as tetraallyloxyethane, pentaerythritol diallyl ether, pentaerythritol triallyl ether, and pentaerythritol tetraallyl ether), and poly(meth)allyloxyalkane. Any one of these crosslinkable monomers may be used singly or two or more kinds thereof may be used in combination.

"(Meth)acryloyl" means acryloyl or methacryloyl. The same applies "(meth)acrylate" and "(meth)allyloxy."

As the crosslinkable monomer in the invention, from the viewpoint of excellent hydrolysis resistance, a polyallyl ether compound is preferred.

The crosslinked resin may further contain an N-vinylcarboxylic acid amide unit.

As the N-vinylcarboxylic acid amide, for example, a compound represented by $CH_2=CH-N(R^1)COR^2$ (in the formula, $R^1$ is the same as described above, and $R^2$ represents a hydrogen atom or an alkyl group having 1 to 6 carbon atoms) is exemplified. The alkyl group may be linear or branched, and an alkyl group having 1 to 6 carbon atoms is preferred.

Specific examples of the N-vinylcarboxylic acid amide include N-vinylformamide, N-methyl-N-vinylformamide, N-vinylacetamide, N-methyl-N-vinylacetamide, N-vinylpropionamide, N-methyl-N-vinylpropionamide, N-vinylbutylamide, and N-vinylisobutylamide. Any one of these N-vinylcarboxylic acid amides may be used singly or two or more kinds thereof may be used in combination.

The crosslinked resin may further contain a unit having an amidine group.

The amidine group is a group including an N=C—N structure.

For example, when a polymer containing an N-vinylformamide unit is subjected to hydrolytic degradation with an acid or a base, a polymer having an N-vinylformamide unit and a vinyl amine unit is obtained. The hydrolytic degradation proceeds under an acidic or basic condition; on the other hand, a formamide group of the N-vinylformamide unit and an amino group of the vinyl amine unit that are adjacent to each other react with each other under a neutral condition as described below, and the respective groups may form a 6-membered amidine group along with bonded carbon atoms and one carbon atom between these groups.

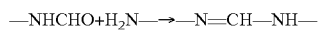

—NHCHO+$H_2$N—→—N=CH—NH—

The crosslinked resin may further contain monomer units other than the vinyl amine unit, the crosslinkable monomer unit, the N-vinylcarboxylic acid amide unit, and the unit having an amidine group.

The other monomers are not particularly limited as long as they can be copolymerized with N-vinylcarboxylic acid amide or the like. Examples thereof include alkali metal salts or ammonium salts of (meth)acrylonitrile, (meth)acrylamide, N-alkyl (meth)acrylamide, N,N'-dialkyl (meth)acrylamide, N,N'-dialkylaminoalkyl (meth)acrylamide, and (meth)acrylamide alkanesulfonate, alkali metal salts or ammonium salts of (meth)acrylic acid, alkali metal salts or ammonium salts of hydroxyalkyl (meth)acrylate, dialkylaminoalkyl (meth)acrylate, (meth)acryloyloxy alkyl-trimethyl ammonium salt, and (meth)acryloyloxy alkanesulfonate, and alkali metal salts or ammonium salts of N-vinylpyrrolidone, vinylpyridine, vinylimidazole, vinylbenzyl trialkylammonium salt, and vinyl sulfonic acid. Any one of other monomers may be used singly or two or more kinds thereof may be used in combination.

The content of the vinyl amine unit in the crosslinked resin is preferably 10 to 99.5 mol % and more preferably 30 to 99.5 mol % with respect to the total molar quantity of the whole units. When the content of the vinyl amine unit is equal to or more than the lower limit value, the adsorptive property of the gold cyano complex becomes more excellent.

The proportion of the vinyl amine unit of the salt type among the vinyl amine units in the crosslinked resin is preferably 30 mol % or more and more preferably 50 mol % or more and may be 100 mol % with respect to the total molar quantity of the whole vinyl amine units. When the proportion of the vinyl amine unit of the salt type is equal to or more than the lower limit value, the adsorptive property of the gold cyano complex becomes more excellent.

The content of the N-vinylcarboxylic acid amide unit in the crosslinked resin is preferably 0 to 90 mol % and more preferably 0 to 70 mol % with respect to the total molar quantity of the whole units. When the content of the N-vinylcarboxylic acid amide unit is equal to or less than the upper limit value, the adsorptive property of the gold cyano complex becomes more excellent.

The content of the unit having an amidine group in the crosslinked resin is preferably 10 to 80 mol % and more preferably 20 to 70 mol % with respect to the total molar quantity of the whole units. When the content of the unit having an amidine group is equal to or more than the lower limit value, the adsorptive property of the gold cyano complex becomes more excellent. It is necessary to perform long-term reaction in order for the content of the unit having an amidine group to exceed the upper limit value, which is not practical.

The content of the crosslinkable monomer unit in the crosslinked resin is preferably 1 to 10% by mass and more preferably 2 to 7% by mass with respect to the total mass of the whole units. As the content of the crosslinkable monomer unit becomes smaller, the crosslinking density of the crosslinked resin is decreased. When the crosslinking density is low, the swelling degree of the crosslinked resin when gold is recovered is increased and the surface area is increased, so that the adsorbed amount is considered to be also increased. On the other hand, when the crosslinking density is too low, the mechanical strength of the crosslinked resin is decreased so that the crosslinked resin may be easily broken and may not function as an adsorbent. When the content of the crosslinkable monomer unit is in the above range, the adsorbed amount can be increased while sufficient mechanical strength is secured.

Since the crosslinked resin includes a crosslinked structure, the crosslinked resin is water-insoluble. Since the crosslinked resin is insoluble in water, the crosslinked resin can be separated from the solution containing the gold cyano complex with a simple operation.

The term "water-insoluble" means that the amount of dissolution at 25° C. with respect to 100 g of water is less than 0.05 g.

The crosslinked resin may be formed in the shape such as a granular shape, a fiber shape, a gel shape, or a powder shape.

In the case of a granular shape, the average particle size of the crosslinked resin is preferably 0.1 to 3 mm and more preferably 0.1 to 1 mm. When the average particle size is equal to or more than the lower limit value, handleability is more excellent. When the average particle size is equal to or less than the upper limit value, the adsorptive property of the gold cyano complex becomes more excellent.

The average particle size of the crosslinked resin is a value at the time of swelling with water and is measured by a particle size distribution analyzer.

<Method for Producing Crosslinked Resin>

The crosslinked resin containing a vinyl amine unit can be produced, for example, by a production method including Step 1 and Step 2 described below:

Step 1: a step of polymerizing a monomer mixture, which contains N-vinylcarboxylic acid amide, a crosslinkable monomer, and as necessary, another monomer copolymerizable with the N-vinylcarboxylic acid amide and the crosslinkable monomer, using a polymerization initiator to thereby obtain a polymer containing an N-vinylcarboxylic acid amide unit and a crosslinked structure; and Step 2: a step of subjecting the polymer to hydrolytic degradation in the presence of an acid or a base after the above Step 1.

The N-vinylcarboxylic acid amide, the crosslinkable monomer, and another monomer are the same as described above, respectively, and preferred embodiments are also the same as described above.

As the N-vinylcarboxylic acid amide used in Step 1, among the examples described above, from the viewpoint of excellent easiness of derivation to the vinyl amine unit, N-vinylformamide is preferred.

The proportion of N-vinylcarboxylic acid amide in the monomer mixture is preferably 10 to 100 mol % and more preferably 50 to 100 mol % with respect to the total molar quantity of the whole monomers.

The proportion of the crosslinkable monomer is preferably in a range of 1 to 10% by mass and more preferably in a range of 2 to 7% by mass with respect to the total mass of the whole monomers.

In Step 1, the method of polymerizing a monomer mixture is not particularly limited. As the method of polymerizing a monomer mixture, a general radical polymerization method is used. For example, any of bulk polymerization, aqueous solution polymerization, reversed phase suspension polymerization, reversed phase emulsion polymerization, and the like can be selected.

The polymerization reaction is usually performed at a temperature of 30° C. to 100° C. in an inert gas flow. In a case where the polymerization of the monomer mixture in a solvent, the concentration of the monomer mixture is usually 5 to 80% by mass and preferably 10 to 70% by mass. The pH at the time of polymerization is preferably adjusted to 5 to 9 from the viewpoint of stability at the time of preparing the monomer mixture.

As the method of polymerizing a monomer mixture, among the examples described above, reversed phase suspension polymerization is preferred. By polymerizing a monomer mixture by reversed phase suspension polymerization, a granular crosslinked resin having an average particle size of 0.1 to 3 mm can be easily obtained.

In the reversed phase suspension polymerization, an aqueous solution of the monomer mixture is dispersed in a dispersion medium in the presence of a surfactant and a dispersant to perform polymerization.

The amount of water used in the reversed phase suspension polymerization is usually 0.1 to 3 times by mass, preferably 0.2 to 2 times by mass, further preferably 0.3 to 1 times by mass with respect to the total mass of the whole monomers. In a case where the amount of water is more than the above range, the molecular weight of the polymer to be produced tends to decrease, and in a case where the amount thereof is less than the above range, dispersing of water drops may become insufficient.

As the dispersion medium, typically, a hydrocarbon-based dispersion medium is used.

As the hydrocarbon-based dispersion medium, hydrocarbon azeotropic with water is preferred. Examples thereof include chain saturated hydrocarbons such as n-hexane, n-heptane, n-octane, nonane, decane, undecane, and dodecane; petroleum fractions of petroleum fraction having a boiling point of 65° C. to 250° C. (preferably 80° C. to 180° C.), alicyclic hydrocarbons such as cyclohexane and methylcyclohexane; and aromatic hydrocarbons such as benzene, toluene, xylene, and ethylbenzene.

The dispersion medium is used in a range of usually 0.5 to 10 times by mass and preferably 1 to 5 times by mass with respect to the total mass of the aqueous solution of the monomer mixture.

Further, the amount of the dispersion medium used is usually 20% by mass or more, preferably 30% by mass or more, and further preferably 40% by mass or more of the total amount of water used.

The method of dispersing the monomer mixture and water in the dispersion medium is not particularly limited. For example, a method of adding water in a dispersion medium in advance, forming a suspension phase by stirring, and adding a monomer to be polymerized without any change or as an aqueous solution with addition of remaining water to the suspension phase is preferred.

A surfactant to be used in polymerization may form a desired granular shape and a particle size in a reversed phase suspension system. For example, a non-ionic surfactant having a hydrophilic lipophilic balance (HLB) of usually 9 to 20, preferably 12 to 19, is used.

Examples of the non-ionic surfactant having an HLB in the above range include polyoxyethylene alkyl ether, polyoxyethylene alkyl phenyl ether, polyoxyethylene alkyl ester, monoglyceride, sorbitol alkyl ester, and sucrose alkyl ester. Specific examples thereof include polyoxyethylene nonyl phenyl ether, polyoxyethylene octyl phenyl ether, polyoxyethylene lauryl ether, polyoxyethylene oleyl ether, polyoxyethylene tridecyl ether, polyoxyethylene cetyl ether, polyoxyethylene stearyl ether, polyoxyethylene phenyl ether, polyoxyethylene laurate, polyoxyethylene oleate, polyoxyethylene stearate, polyoxyethylene sorbitan laurate, polyoxyethylene sorbitan oleate, and polyoxyethylene sorbitan stearate. Any one of these non-ionic surfactant may be used singly or two or more kinds thereof may be used concurrently.

Among these, polyoxyethylene alkyl ether or polyoxyethylene alkyl phenyl ether are preferred.

The amount of the surfactant used is preferably 0.5 to 3% by mass and more preferably 1 to 2.5% by mass with respect to the dispersion medium in order to obtain fine particles. When the amount of the surfactant used is more than the above range, emulsification easily occurs, and when the amount thereof is less than the above range, that enlargement of particle size may be brought about.

The method of adding a surfactant is not particularly limited. For example, a method of adding a surfactant into a dispersion medium before being brought into contact with the monomer is preferred.

As the polymerization initiator, general radical polymerization initiators can be used. Of them, an azo compound is preferred. A water-soluble azo compound is particularly preferred, and examples thereof include hydrochlorides, sulfates, and acetates of 2,2'-azobis-2-amidinopropane, hydrochlorides, sulfates, and acetates of azobis-N,N'-dimethylene isobutylamidine, and alkali metal salts and ammonium salts of 4,4'-azobis-4-cyanovaleric acid.

The amount of the radical polymerization initiator used is in a range of usually 100 to 10000 ppm by mass and preferably 500 to 7000 ppm by mass with respect to the total mass of the whole monomers.

The method of adding a polymerization initiator is not particularly limited. For example, a method of adding a polymerization initiator into a dispersion medium before being brought into contact with the monomer is preferred.

At the time of polymerization, depending on circumstances, as a polymerization stabilizer, an additive such as ammonium chloride or calcium chloride is used.

The amount of the additive used is usually 0.1 to 20% by mass and preferably 1 to 15% by mass with respect to the total mass of the whole monomers.

The polymerization temperature is usually 30° C. to 100° C. and preferably 50° C. to 80° C.

The polymerization time is usually 0.5 to 10 hours and preferably 1 to 5 hours.

Incidentally, since polymerization heat is generated at the time of polymerization, generally, by cooling a polymerization system, the polymerization temperature is adjusted to be maintained in the above range.

For carrying out polymerization, for example, a method is exemplified in which a dispersion medium containing a surfactant, a polymerization initiator, and the like is maintained at the polymerization temperature, an aqueous solution of a monomer mixture is added in the dispersion medium under stirring in a nitrogen gas flow. However, the order of mixing a monomer mixture, water, a surfactant, a polymerization initiator, and the like is not particularly limited.

The adjustment of the molecular weight of the polymer to be obtained is performed depending on polymerization conditions, but as necessary, a chain transfer agent including alcohols such as isopropyl alcohol and allyl alcohol, mercaptans such as thioglycolic acid and thioglycerol, or phosphites such as sodium hypophosphite can be used.

The polymer obtained in Step 1 contains an N-vinylcarboxylic acid amide unit and a crosslinkable monomer unit. When the polymer is subjected to hydrolytic degradation in Step 2, a part or the entire of the N-vinylcarboxylic acid amide unit in the polymer is converted into a vinyl amine unit to thereby obtain a crosslinked resin containing a vinyl amine unit.

The hydrolytic degradation of the polymer in Step 2 is performed in the presence of an acid or a base.

Examples of the acid include hydrochloric acid, nitric acid, sulfuric acid, phosphoric acid, formic acid, and acetic acid.

Examples of the base include lithium hydroxide, sodium hydroxide, potassium hydroxide, sodium carbonate, and potassium carbonate.

The amount of the acid or base is preferably 0.05 to 10 molar equivalents and more preferably 0.1 to 5 molar equivalents with respect to the N-vinylcarboxylic acid amide unit in the polymer.

The hydrolytic degradation temperature is usually 30° C. to 120° C. and preferably 50° C. to 100° C. When the hydrolytic degradation temperature is set to 50° C. or higher, a desired hydrolytic degradation rate is obtained in a relatively short time. When the hydrolytic degradation temperature is set to 100° C. or lower, side reaction such as a decrease in molecular weight due to heat can be suppressed.

The hydrolytic degradation time is usually 0.5 to 10 hours and preferably 1 to 7 hours.

In the case of performing hydrolytic degradation with an acid, the vinyl amine unit in the crosslinked resin after hydrolytic degradation forms a salt with the used acid to become a salt type. On the other hand, in the case of performing hydrolytic degradation with a base, a salt is not formed. That is, the amino group of the vinyl amine unit exists alone.

As described above, in a case where at least a part of the vinyl amine unit in the crosslinked resin forms a salt, the adsorptive property of gold becomes more excellent. Therefore, the hydrolytic degradation is preferably performed in the presence of an acid. Alternatively, it is preferable that the hydrolytic degradation is performed in the presence of a base, an acid is then added to the obtained crosslinked resin, and at least a part of the vinyl amine unit is made to be a salt type.

The amount of the acid to be added after hydrolytic degradation in the presence of a base is preferably 10 to 100 mol % and more preferably 50 to 100 mol % with respect to the vinyl amine unit. The amount of the acid to be added of equal to or less than the upper limit value is preferred from the viewpoint of preventing a decrease in purity due to an excessive amount of the acid, and the amount of the acid to be added of equal to or more than the lower limit value is preferred from the viewpoint of improving the adsorptive property of gold.

(Solution Containing Gold Cyano Complex)

A solution from which gold is recovered using the crosslinked resin contains a gold cyano complex.

The solution is typically an aqueous solution.

The concentration of the gold cyano complex in the solution is not particularly limited. For example, the concentration thereof is preferably 0.1 to 200 ppm by mass and more preferably 0.5 to 100 ppm by mass. In a conventional recovery method, when the concentration of the gold cyano complex is equal to or less than the upper limit value, it is difficult to efficiently recover gold. In the invention, even when the concentration of the gold cyano complex is equal to or less than the upper limit value, gold can be efficiently recovered.

The solution may contain impurity ions containing a metal other than gold.

Examples of the metal in the impurity ions include nickel, cobalt, copper, and zinc. Examples of the impurity ions include ions and complexes of those metals. Examples of the complexes include a cyano complex and a chloride complex. Specific examples of the impurity ions include a nickel cyano complex, a cobalt cyano complex, a copper cyano complex, nickel ions, cobalt ions, copper ions, and zinc ions. One or two or more kinds of the impurity ions contained in the solution may be used.

The concentration of the impurity ions in the solution may be, for example, 0.1 to 1000 ppm by mass.

The solution is preferably a drainage obtained after recovering gold in a cyaniding method.

As described above, in the cyaniding method, gold contained in mineral ores or the like is extracted as a cyano complex and recovered. A cyanide solution is used for extraction. The recovering of gold is generally performed by an adsorption treatment by activated charcoal or a precipitation treatment by addition of zinc. In the adsorption treatment, activated charcoal is added to a solution (pregnant solution) containing a gold cyano complex extracted using a cyanide solution to adsorb the gold cyano complex, and the activated charcoal to which the gold cyano complex is adsorbed is recovered. In the precipitation treatment, zinc is added to a pregnant solution, gold of a gold cyano complex is substituted with zinc to precipitate gold, and the precipitated gold is recovered. However, it is difficult to completely recover gold at this time, and the gold cyano complex is contained in the drainage obtained after recovering gold. In the case of using the crosslinked resin, gold that is an extremely useful resource can be recovered from the discharged water to be discarded and can be utilized.

The concentration of the gold cyano complex in the drainage is typically 0.1 to 200 ppm by mass. Further, other than the gold cyano complex, a zinc cyano complex or the like may be contained as impurity ions in the drainage in many cases.

(Method for Recovering Gold)

The recovering of gold from the solution containing a gold cyano complex can be carried out, for example, by a method including the following Step i and Step ii:

Step i: a step of bringing a crosslinked resin containing a vinyl amine unit into contact with a solution containing a gold cyano complex; and Step ii: a step of separating the crosslinked resin and the solution from each other after the above Step i.

<Step i>

In Step i, the crosslinked resin and the solution are brought into contact with each other. According to this, the gold cyano complex in the solution is trapped in the crosslinked resin.

The method of bringing the crosslinked resin and the solution into contact with each other is not particularly limited. For example, the following method (a), method (b), method (c), and the like are exemplified:

(a) a method of putting the crosslinked resin in the solution;

(b) a method of allowing the solution to pass through a container inside which the crosslinked resin is accommodated in a flowable manner; and (c) a method of allowing the solution to pass through a container (column, packed tower, or the like) filled with the crosslinked resin.

In the case of the method (a), the mass (solid content) of the crosslinked resin to be put in the solution is preferably 0.1 to 100 times, more preferably 0.2 to 50 times, and further preferably 0.3 to 30 times with respect to the mass of the gold cyano complex in the solution. When the mass of the crosslinked resin is equal to or more than the lower limit value of the above range, the recovery efficiency of the gold cyano complex is more excellent. When the mass of the crosslinked resin is equal to or less than the upper limit value of the above range, the amount of the crosslinked resin used can be reduced, which is economically useful.

In the case of the method (a), the time for bringing the solution and the crosslinked resin into contact with each other (time from a time point at which the solution and the crosslinked resin are brought into contact with each other to a time point at which the solution and the crosslinked resin are separated from each other in the next Step ii) is preferably 1 minute or longer and more preferably 10 minutes or longer.

The method (b) can be performed, for example, by a method of allowing the solution to pass through a region in which the crosslinked resin having a granular shape is suspended in an embodiment close to a fluidized bed or a diaphragm separation activated sludge process (MBR method).

In the method (b) and the method (c), Step i and Step ii which is described below can be continuously performed (for example, a method of (4) described below).

In the case of the method (b) or (c), regarding the condition for allowing the solution to pass, the time required for allowing the solution having the same volume as that of the region or the container to pass therethrough is set to preferably 1 minute or longer and more preferably 10 minutes or longer. When the time required for allowing the solution having the same volume as that of the region or the container to pass therethrough is equal to or more than the lower limit value, the adsorbed amount of gold is improved, which is preferable, and when time required for allowing the solution having the same volume as that of the region or the container to pass therethrough is equal to or less than the upper limit value, the treatment time is shortened, which is preferable.

The temperature when the crosslinked resin and the solution are brought into contact with each other is preferably 0° C. to 100° C. and more preferably 5° C. to 50° C.

The present inventors have found that, in a case where the solution contains the impurity ions, when contact between the crosslinked resin and the solution is performed under a condition of a relatively low pH, gold can be selectively trapped.

In a case where the solution contains the impurity ions, the contact between the crosslinked resin and the solution is preferably performed at a pH of 4 or less and more preferably performed at a pH of 3.5 or less. Also considering the lower limit, the contact therebetween is preferably performed in a range of pH of 0.1 to 4 and more preferably performed in a range of pH of 0.1 to 3.5.

It is considered that the crosslinked resin adsorbs the gold cyano complex by a part of ligand of the complex being replaced with an amino group of vinylamine in the crosslinked resin. The gold cyano complex is stable among complexes formed by gold, but when the pH of the solution in which the gold cyano complex exists is lowered, the reactivity is increased. When the pH is 3.5 or less, the reactivity of the gold cyano complex is increased, and the adsorption rate to the crosslinked resin is increased. On the other hand, when the pH is lowered, the adsorption rate of the cyano complex of the metal to the crosslinked resin is decreased. However, since a decrease in adsorption rate of the gold cyano complex due to a decrease in pH is smaller than that of a cyano complex of another metal, the selectivity of the gold cyano complex is considered to be increased in a region with a low pH. When the pH is 3.5 or less, this tendency becomes significant, and the gold cyano complex can be selectively recovered.

When the pH is 0.1 or more, it is not necessary to add a large amount of an acid in pH adjustment, and the pH adjustment can be easily performed.

The pH is a value at a temperature during the crosslinked resin and the solution are in contact with each other. For example, in a case where the crosslinked resin and the solution are brought into contact with each other at 20° C., the pH is a pH at 20° C., and in a case where the crosslinked resin and the solution are brought into contact with each other at 30° C., the pH is a pH at 30° C.

The pH can be adjusted using inorganic acids such as hydrochloric acid, sulfuric acid, and nitric acid, organic acids such as formic acid, acetic acid, methanesulfonic acid, and p-toluenesulfonic acid, alkali metal hydroxides such as sodium hydroxide and potassium hydroxide, alkaline-earth metal hydroxides such as magnesium hydroxide and calcium hydroxide, ammonia, and the like.

In a case where the solution containing the gold cyano complex is a drainage obtained after recovering gold in the cyaniding method, as the method of bringing the crosslinked resin and the drainage into contact with each other, any of the method (a), the method (b), and the method (c) described above can be used.

When the drainage obtained after recovering gold in the cyaniding method and the crosslinked resin are brought into contact with each other, the pH of the drainage is preferably 4.0 or less, more preferably 3.5, further preferably 0.1 to 4, and particularly preferably 0.1 to 3.5.

When the pH is equal to or less than the upper limit value, the adsorption rate of the gold cyano complex in the drainage obtained after recovering gold in the cyaniding method to the crosslinked resin becomes higher. Further, since a decrease in adsorption rate of the gold cyano complex due to a decrease in pH is smaller than that of a cyano complex of another metal, when the pH is equal to or less than the upper limit value, the gold cyano complex can be selectively recovered from the drainage obtained after recovering gold in the cyaniding method.

The temperature when the drainage obtained after recovering gold in the cyaniding method and the crosslinked resin are brought into contact with each other is preferably 0° C. to 100° C. and more preferably 5° C. to 50° C.

The time when the drainage obtained after recovering gold in the cyaniding method and the crosslinked resin are brought into contact with each other is preferably 1 minute or longer and more preferably 10 minutes or longer.

<Step ii>

In Step ii, the crosslinked resin and the solution which have been brought into contact with each other in Step i are separated from each other. According to this, the gold cyano complex trapped in the crosslinked resin is recovered together with the crosslinked resin.

The separation and recovery of the crosslinked resin can be carried out, for example, by methods described in the following (1) to (4). However, the method of separating and recovering the crosslinked resin is not limited to these examples.

(1) Filtration method in which filtration under reduced pressure, filtration under pressure, and centrifugal separation are performed using a filter, a filter cloth, or the like and the filtration residue is recovered (2) Membrane separation method (technique similar to the MBR method) in which water and a dissolved matter are separated from the solution using a microfiltration membrane or an ultrafiltration membrane, and the concentration of the slurry of the crosslinked resin is increased to perform recovering (3) Precipitation method using natural precipitation, centrifugal precipitation, a flocculant, or the like (4) Method in which the molded crosslinked resin is accommodated in a container such that the crosslinked resin can be fluidized inside the container, the solution is supplied to the container, the crosslinked resin is fluidized in the solution, the crosslinked resin is then kept in the container, and only the solution is flowed out from the container For example, in a case where the crosslinked resin is put in the solution in Step i as in the method (a), the crosslinked resin may be recovered by the method (1).

In the method of allowing the solution to pass through a region in which the crosslinked resin is suspended in Step i as in the method (b), the crosslinked resin may be recovered by the method (2).

In a case where the solution is allowed to pass through the container filled with the crosslinked resin in Step i as in the method (c), after the solution passing therethrough is stopped and the solution in the container is drained, the crosslinked resin may be recovered from the container.

In the method (2), the slurry in which the concentration of the crosslinked resin is increased may be treated by a filtration method, a precipitation method, or the like.

The recovered crosslinked resin may be further dehydrated using a press, a centrifuge, or the like.

In a preferred embodiment of the method for recovering gold of the invention, Steps i and ii are performed using a gold recovery facility which includes a container inside which the crosslinked resin is accommodated in a flowable manner and a device feeding the solution to the container (hereinafter, also referred to as a gold recovery facility of a first embodiment).

In the gold recovery facility of the first embodiment, the crosslinked resin is not fixed into the container and is fluidized when the solution is fed to the container and is circulated in the container.

Examples of the container include a fluidizing tank and a multiple-stage fluidizing tank.

As a device which feeds the solution to the container, for example, a device, which includes a pipe connected to the container and a liquid feeding pump attached to the pipe, is exemplified.

FIG. 1 illustrates an example of a gold recovery facility according to a first embodiment.

A gold recovery facility 20 of this example includes a reservoir 21 for a solution containing a gold cyano complex, a fluidizing tank 23 (container), a first flow passage 25, a liquid feeding pump 27 provided in the first flow passage 25, and a second flow passage 29.

The fluidizing tank 23 includes a cylindrical body portion, an upper portion disposed at the upper side of the body portion, and a lower portion disposed at the lower side of the body portion, the crosslinked resin is accommodated in the body portion of the fluidizing tank 23 in a flowable manner. Wire nets 23a and 23b are provided at a boundary portion between the body portion and the upper portion and at a boundary portion between the body portion and the lower portion, respectively. The crosslinked resin inside the body portion is not flowed out by these wire nets 23a and 23b.

The upstream end of the first flow passage 25 is connected to the reservoir 21, and the downstream end thereof is connected to the lower portion of the fluidizing tank 23. By operating the liquid feeding pump 27, the solution inside the reservoir 21 can be fed to the fluidizing tank 23 through the first flow passage 25. That is, in this example, the first flow passage 25 and the liquid feeding pump 27 function as a device which feeds the solution to the container.

The upstream end of the second flow passage 29 is connected to the upper portion of the fluidizing tank 23, and the solution having passed through the fluidizing tank 23 is flowed out from the fluidizing tank 23.

Steps i and ii in the gold recovery facility 20 can be carried out in the following manner.

When the liquid feeding pump 27 is operated in a state of the solution being accommodated in the reservoir 21 and the solution is fed to the fluidizing tank 23, the crosslinked resin is fluidized in the fluidizing tank 23, the solution and the crosslinked resin are brought into contact with each other, and the gold cyano complex in the solution is trapped in the crosslinked resin. The concentration of the gold cyano complex is reduced and the solution is discharged from the fluidizing tank 23. The crosslinked resin remains without any change in the fluidizing tank 23. As a result, the solution and the crosslinked resin can be separated from each other.

As described above, when the degree of crosslinking is low, the swelling degree of the crosslinked resin when gold is recovered is increased and the surface area is increased, so that the adsorbed amount is also increased. On the other hand, when the crosslinking density is too low, the mechanical strength of the crosslinked resin is decreased. In the gold recovery facility of the first embodiment, since the crosslinked resin is fluidized, even a crosslinked resin having a low degree of crosslinking which is broken by general column filling can be used. Therefore, according to the gold recovery facility of the first embodiment, the contact efficiency is further higher, and the adsorption rate also becomes faster. Thus, the gold recovery facility of the first embodiment is useful as a facility for carrying out the recovering method of the invention.

The operations of Steps i and ii may be performed by any of a continuous process and batch type.

After Step ii, a step of recovering the gold cyano complex bonded to the recovered crosslinked resin may be performed. The recovering of the gold cyano complex from the crosslinked resin can be carried out, for example, by incineration of the crosslinked resin.

In the method for recovering gold of the invention described above, since the crosslinked resin containing a vinyl amine unit is used, gold can be efficiently recovered from the solution containing the gold cyano complex. Since the crosslinked resin contains a vinyl amine unit, the gold cyano complex can be efficiently trapped from the solution containing the gold cyano complex. Further, since the crosslinked resin is insoluble in water, the crosslinked resin can be separated from the aqueous solution with a simple operation. Therefore, for example, the gold cyano complex can be efficiently recovered by a simple operation of bringing the crosslinked resin and the solution into contact with each other and separating the crosslinked resin and the solution from each other. The recovering of gold can be performed even in a case where the concentration of the gold cyano complex in the solution is low or in a case where another metal is dissolved in the solution (in a case where the impurity ions are contained). In particular, when the pH is 4 or less, the adsorptive property of the crosslinked resin to the another metal is decreased, and the impurity ions easily remain in the solution without being trapped. Therefore, gold can be selectively recovered.

EXAMPLES

Hereinafter, the invention will be described in detail by means of Examples, but the invention is not limited by these Examples.

Unless particularly specified, "%," "ppm," and "ppb" mean "% by mass," "ppm by mass," and "ppb by mass," respectively. The concentration of metal was measured using Polarized Zeeman Atomic Absorption Spectrophotometer ZA3700 (manufactured by Hitachi High-Tech Corporation). Room temperature was 21° C.

Production Example 1

To a reaction container equipped with a stirrer, a dropping funnel, and a jacket, 480 mL of cyclohexane, 5.6 g of polyoxyethylene alkyl ether (HLB 14), 5.5 g of ammonium chloride, 39 g of water, and 0.4 g of 2,2'-azobis(2-amidino-propane)dihydrochloride were added, 116 g of N-vinylformamide, 0.02 g of sodium hypophosphite, 7.6 g of aqueous solution of 50% polyethyleneglycol 2000, 2.2 g of diallylamine (2% by mass with respect to N-vinylformamide), and 26 g of water were put in the dropping funnel and added dropwise over 3 hours by heating at 55° C. under stirring while mixing nitrogen, and then the resultant produce was held at 57° C. for 2 hours, thereby obtaining a granular crosslinked N-vinylformamide polymer.

Subsequently, to a reaction container equipped with a stirrer and a jacket, 12 g of crosslinked N-vinylformamide polymer (net amount), 14.1 g of aqueous solution of 48% sodium hydroxide, 123 g of water, 0.48 g of sodium dithionite, and 0.12 g of tetrasodium ethylenediaminetetraacetate were added and stirred at 50° C. for 30 minutes and then at 80° C. for 3 hours. After the completion of reaction, filtration and washing with water were performed to obtain granular crosslinked polyvinyl amine (crosslinked resin). The particle size at the time of swelling was approximately 1 to 2 mm. About 5 mg (net amount) of the crosslinked polyvinylamine was taken and suspended in 100 g of water, and as a result, dissolution was not observed.

$^{13}$C nuclear magnetic resonance (NMR) (270 MHz, $D_2O$) measurement was performed, and as a result, in the obtained crosslinked polyvinylamine, the amino group was 75.7 mol %, the formyl group was 9.9 mol %, and the amidine group was 7.2 mol % with respect to the whole units (100 mol %). Therefore, the vinyl amine unit was 75.7 mol %, the N-vinylformamide unit was 9.9 mol %, and the unit having an amidine group was 7.2 mol %.

Production Example 2

Formic acid was added to the crosslinked polyvinylamine reaction solution before filtration in Production Example 1 and stirred for 30 minutes. Thereafter, similarly to Production Example 1, filtration and washing with water were performed to obtain granular crosslinked polyvinylamine. The amount of the formic acid is 100 mol % with respect to the amino group (vinyl amine unit) in the crosslinked polyvinylamine.

Example 1

An aqueous solution in which the content of gold(I) potassium cyanide as a gold cyano complex is 73 ppm (63 ppm as gold cyano complex concentration, 50 ppm as gold concentration) with respect to the total amount and the content of nickel(I) potassium cyanide monohydrate as a nickel cyano complex is 441 ppm (370 ppm as nickel cyano complex concentration, 100 ppm as nickel concentration) with respect to the total amount, was prepared, and the pH was adjusted to 5.8, 3.5, or 2.2 with hydrochloric acid.

To a reaction container, 40 g of the aqueous solution (pH being any of 5.8, 3.5, or 2.2) was input, the crosslinked polyvinylamine of Production Example 1 was added and stirred at room temperature for 6 hours. The crosslinked polyvinylamine was added in a net amount of 0.02 g so that the concentration of the crosslinked polyvinylamine in the total of the aqueous solution and the crosslinked polyvinylamine became 500 ppm. Thereafter, filtration was performed with a filter having a pore diameter of 0.2 μm, and the concentration (ppm) of metal in the filtrate was analyzed. The adsorption rate (%) was calculated by the following equation from the measured value. The results are shown in Table 1. In Table 1, PVAM represents crosslinked polyvinylamine, and the same applies the following description.

Adsorption rate (%)={(Concentration (ppm) of the metal in the aqueous solution before addition of crosslinked polyvinylamine−Concentration (ppm) of the metal in the filtrate)/Concentration (ppm) of the metal in the aqueous solution before addition of crosslinked polyvinylamine}× 100

Example 2

The same operation as in Example 1 was performed, except that crosslinked polyvinylamine of Production Example 2 was used instead of crosslinked polyvinylamine of Production Example 1, and the adsorption rate (%) was calculated. The results are shown in Table 1.

Example 3

The same operation as in Example 1 was performed, except that a drainage obtained after recovering gold in a cyaniding method was used instead of the aqueous solution containing a gold cyano complex and a nickel cyano complex of Example 1 and the pH was adjusted to 3.5, and the adsorption rate (%) was calculated. The results are shown in Table 1. Incidentally, in the drainage obtained after recovering gold in the cyaniding method, 20 ppm (14 ppm as gold concentration) of the gold cyano complex with respect to the total amount of the drainage was contained.

Example 4

27 g of the crosslinked polyvinylamine of Production Example 1 as a noble metal trapping agent was put in a cylindrical fluidizing tank which has an inner diameter of 20 cm and a height of 20 cm and is horizontally partitioned with a stainless steel wire net of 40 meshes. This cylindrical fluidizing tank was used as the fluidizing tank 23 to manufacture a noble metal recovery facility having the configuration illustrated in FIG. 1. An aqueous solution in which the content of gold(I) potassium cyanide as a gold cyano complex is 73 ppm (63 ppm as gold cyano complex concentration, 50 ppm as gold concentration) with respect to the total amount was allowed to pass from the lower portion of the cylindrical fluidizing tank at 1 L/min to fluidize the noble metal trapping agent (crosslinked resin). After 2 hours from passing water, effluent water was collected and filtered with a filter having a pore diameter of 0.2 µm, and the concentration (ppm) of gold in the filtrate was analyzed. The adsorption rate (%) was calculated from the measured value. The results are shown in Table 1.

Comparative Example 1

500 ppm of formic acid was added to the aqueous solution (before pH adjustment with hydrochloric acid) prepared in Example 1 instead of crosslinked polyvinylamine to adjust the pH to 3.5 and stirred at room temperature for 6 hours. Thereafter, filtration was performed with a filter having a pore diameter of 0.2 µm, the concentration (ppm) of metal in the filtrate was analyzed, and the adsorption rate (%) was calculated from the measured value in the same manner as in Example 1. The results are shown in Table 1.

Comparative Example 2

500 ppm of activated charcoal (manufactured by Wako Pure Chemical Industries, Ltd., granular shape) was added to the aqueous solution (before pH adjustment with hydrochloric acid) prepared in Example 1 instead of crosslinked polyvinylamine to adjust the pH to 3.5 and stirred at room temperature for 6 hours. Thereafter, filtration was performed with a filter having a pore diameter of 0.2 µm, the concentration (ppm) of metal in the filtrate was analyzed, and the adsorption rate (%) was calculated from the measured value in the same manner as in Example 1. The results are shown in Table 1.

Comparative Example 3

500 ppm of ion-exchange resin (manufactured by Mitsubishi Chemical Corporation, "DIAION WA10") was added to the aqueous solution (before pH adjustment with hydrochloric acid) prepared in Example 1 instead of crosslinked polyvinylamine to adjust the pH to 3.5 and stirred at room temperature for 6 hours. Thereafter, filtration was performed with a filter having a pore diameter of 0.2 µm, the concentration (ppm) of metal in the filtrate was analyzed, and the adsorption rate (%) was calculated from the measured value in the same manner as in Example 1. The results are shown in Table 1.

TABLE 1

| | PVAM | | Concentration (ppm) of metal in solution | | | Concentration (ppm) of metal in filtrate | | Adsorption rate (%) | |
| --- | --- | --- | --- | --- | --- | --- | --- | --- | --- |
| | Type | Addition amount (ppm) | Au | Ni | Solution pH | Au | Ni | Au | Ni |
| Example 1 | Production Example 1 | 500 | 50 | 100 | 2.2 | 22 | 98 | 56 | 2 |
| | | | 50 | 100 | 3.5 | 15 | 48 | 70 | 52 |
| | | | 50 | 100 | 5.8 | 28 | 11 | 44 | 89 |
| Example 2 | Production Example 2 | 500 | 50 | 100 | 2.2 | 18 | 92 | 64 | 8 |
| | | | 50 | 100 | 3.5 | 12 | 52 | 76 | 48 |
| | | | 50 | 100 | 5.8 | 28 | 13 | 44 | 87 |
| Example 3 | Production Example 1 | 500 | 14 | — | 3.5 | 5 | — | 64 | — |
| Example 4 | Production Example 1 | 500 | 50 | — | 3.5 | 5 | — | 90 | — |
| Comparative Example 1 | None (500 ppm of formic acid being added instead of PVAM) | | 50 | 100 | 3.5 | 50 | 105 | 0 | −5 |
| Comparative Example 2 | None (500 ppm of activated charcoal being added instead of PVAM) | | 50 | 100 | 3.5 | 39 | 67 | 22 | 33 |
| Comparative Example 3 | None (500 ppm of ion-exchange resin being added instead of PVAM) | | 50 | 100 | 3.5 | 42 | 74 | 16 | 26 |

From the result of the Example 1, it was confirmed that, even in the case of any pH of 2.2, 3.5, and 5.8 and even when a nickel cyano complex that is another metal complex coexists, the crosslinked resin containing a vinyl amine unit adsorbs the gold cyano complex at a sufficient adsorption rate. In particular, it was confirmed that, in a low pH range of a pH of 4 or less, the adsorption rate of the another metal complex is lower than the adsorption rate of the gold cyano complex, and the gold cyano complex can be selectively adsorbed.

From the result of the Example 2, it was confirmed that by setting the vinyl amine unit to a salt type, particularly in the case of a pH of 4 or less, the adsorbed amount of the gold cyano complex can be increased. Further, it was confirmed, even in the case of setting the vinyl amine unit to a salt type, similarly to Example 1, the gold cyano complex can be selectively adsorbed in a low pH range.

From the result of Example 3, it was confirmed that, even in the gold cyano complex in the drainage obtained after recovering gold in the cyaniding method, the gold cyano complex is adsorbed at a sufficient adsorption rate.

From the result of Example 4, it was confirmed that, when the gold recovery facility preferable in the method for recovering gold of the invention is used, the gold cyano complex can be rapidly adsorbed up to a low concentration.

From the result of Comparative Example 1, it was confirmed that, in a case where the crosslinked resin containing a vinyl amine unit is not used, the gold cyano complex is dissolved in the aqueous solution so that the gold cyano complex cannot be recovered.

From the results of Comparative Examples 2 and 3, it was found that, in a case where activated charcoal and an ion-exchange resin are used instead of the crosslinked resin containing a vinyl amine unit, the adsorption rate of the gold cyano complex is low as compared to the crosslinked resin containing a vinyl amine unit.

INDUSTRIAL APPLICABILITY

In the method for recovering gold and the gold recovery facility of the invention, since the crosslinked resin having a vinyl amine unit is used, even in a case where the concentration of the gold cyano complex is low, the gold cyano complex can be recovered from the solution containing the gold cyano complex with high efficiency and gold can be recovered with high efficiency. In a case where another metal exists together with the gold cyano complex, the gold cyano complex can also be selectively recovered.

The method for recovering gold and the gold recovery facility of the invention can be used for recovering gold, which remains in a trace amount, from a drainage obtained after recovering gold in a cyaniding method.

EXPLANATIONS OF LETTERS OR NUMERALS

20 GOLD RECOVERY FACILITY
21 RESERVOIR
25 FIRST FLOW PASSAGE
27 LIQUID FEEDING PUMP
29 SECOND FLOW PASSAGE
23 FLUIDIZING TANK

The invention claimed is:

1. A method for recovering gold, comprising:
    contacting a crosslinked resin with a solution containing from 0.1 to 200 ppm by mass of a gold cyano complex at a pH of 3.5 or less such that the gold cyano complex is adsorbed to the crosslinked resin; and
    separating the crosslinked resin to which the gold cyano complex is adsorbed from the solution,
    wherein the crosslinked resin contains 10 to 99.5 mol % of vinyl amine units, 0 to 90 mol % of N-vinylcarboxylic acid amide units, and 10 to 80 mol % of units having an amidine group, based on a total molar amount of all units in the crosslinked resin, and contains 1 to 10% by mass of crosslinkable monomer units relative to a total mass of all units in the crosslinked resin, and
    the solution contacted with the crosslinked resin is a drainage obtained after recovering gold by an adsorption treatment with activated carbon or a precipitation treatment with addition of zinc in a cyaniding method, and contains impurity ions containing a metal other than gold.

2. The method according to claim 1, wherein at least a part of the vinyl amine units in the crosslinked resin forms a salt with an acid, and the acid is at least one selected from the group consisting of mineral acid, formic acid, and acetic acid.

3. The method according to claim 1, wherein the method is performed in a gold recovery facility comprising a container inside which the crosslinked resin is accommodated in a flowable manner, and a device which feeds the solution containing the gold cyano complex to the container.

* * * * *